July 24, 1962     H. S. AYRES     3,045,791
FLEXIBLE ROLLER CONVEYOR
Filed July 20, 1959     2 Sheets-Sheet 1
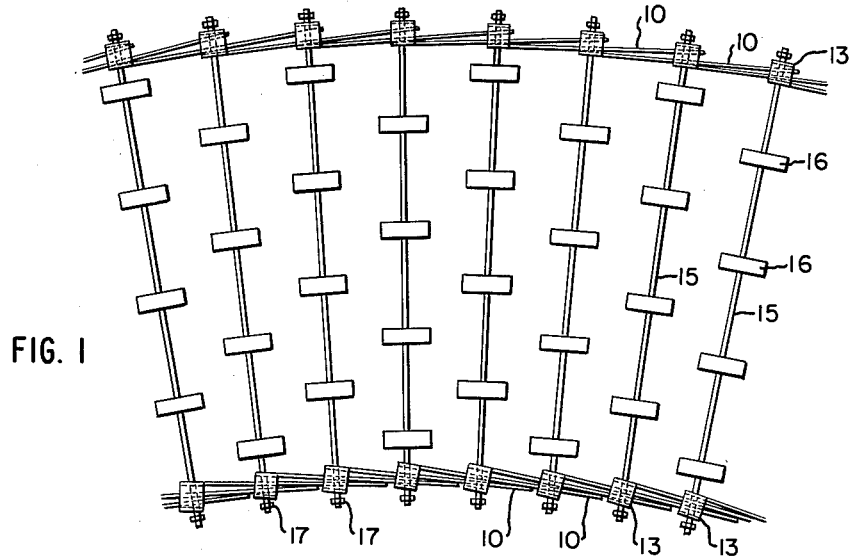
FIG. 1
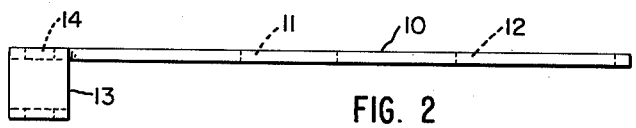
FIG. 2
FIG. 3
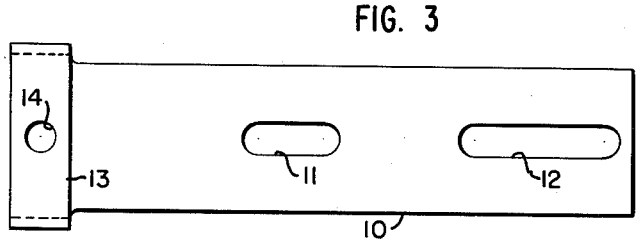
FIG. 4
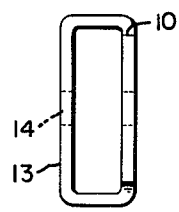
INVENTOR.
Henry S. Ayres
BY
Kenway, Jenney, Witter & Hildreth
Attys.

July 24, 1962 H. S. AYRES 3,045,791
FLEXIBLE ROLLER CONVEYOR
Filed July 20, 1959 2 Sheets-Sheet 2

INVENTOR.
Henry S. Ayres
BY
Kenway, Jenney, Witter & Hildreth
Attys.

3,045,791
FLEXIBLE ROLLER CONVEYOR
Henry S. Ayres, Franklin, La., assignor to Cabot Corporation, Boston, Mass., a corporation of Delaware
Filed July 20, 1959, Ser. No. 828,199
5 Claims. (Cl. 193—35)

This invention comprises a new and improved conveyor of the roller or skate wheel type characterized by slotted side links or plates connected in groups of three in overlapping relation by transverse roller-carrying rods.

Conveyors of this type heretofore available have necessitated the construction of pre-formed bend and turn units for assembly with curved or straight intermediate sections and so have involved careful engineering layout and considerable expense. On the contrary the conveyor of this invention has the advantage of flexibility to the extent that wherever installed it may be led around as much as a 360° turn in either direction or arranged or mounted in helical or spiral formation.

My novel conveyor is made up of an assembly of two elements, viz. elongated clip-carrying side links or plates and transverse roll-carrying rods. All the side links for both sides of the conveyor are identical in construction and design, while all the roll-carrying rods are identical, a characteristic that permits manufacturing cost to be reduced to the minimum. On this account, and for other reasons that will appear hereinafter, my novel conveyor has further advantages in respect to its light weight and simple construction. It may also be lengthened or shortened by adding or removing the side links and their associated cross rods. It may be shipped in knocked-down condition, in easily handled packages, and may be erected on the spot, wherever its use is desired.

These and other features of the invention will be best understood and appreciated from the following description of a preferred embodiment thereof, selected for purposes of illustration and shown in the accompanying drawings in which, FIG. 1 is a plan view of a section of the conveyor.

FIGS. 2, 3 and 4 illustrate one of the side links in elevation, plan and end view respectively.

Figure 5:
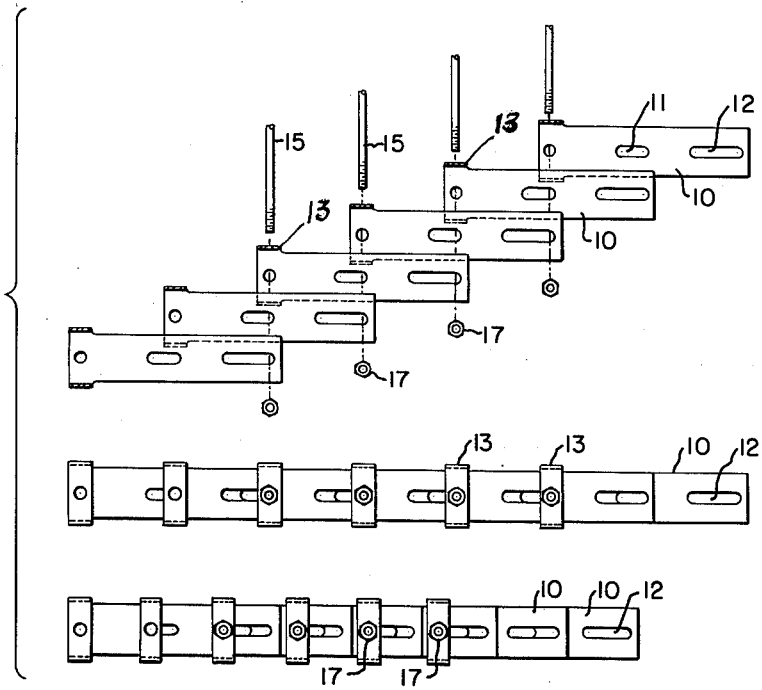
FIG. 5 is a diagram showing a number of the side links arranged preparatory for connection; the same links assembled in elongated relation, and the same links assembled in contracted relation.

As shown in FIGS. 2–4, each side link consists of an elongated rectangular body portion 10 having a short longitudinal slot 11 and a long longitudinal slot 12 arranged in spaced relation. The long slot 12 is twice the length of the short slot 11 and is located near the outer end of the link. Both slots are disposed symmetrically in the longitudinal axis of the link.

At the left hand end of the body 10 of the link as shown in these figures is a rectangular clip 13, the rear or inner wall of which is flush with the body 10 of the link and may be formed therefrom or welded thereto. The side walls of the clip support and merge into the outer wall of the clip at a distance greater at least than the thickness of two links and both the inner and outer walls of the clip have perforations 14 at right angles to the flat face of the link for the purpose of receiving the ends of the roll-carrying rods. The perforations 14 are located in alignment with the slots 11 and 12 of the link..

The roll-carrying rods 15 may be of any convenient length for the width required of the conveyor. Each of these rods is provided with a series of spaced freely-running rolls 16 and it is advantageous to mount these rolls on ball bearings. As shown in FIG. 1, each of the rods 15 carries four rolls 16 mounted in spaced relation on the rod and the rolls are arranged in staggered relation between adjacent rods. The ends of the rods are threaded to receive nuts 17. If desired, cotter pins or solid heads of other form may be substituted.

Having provided a sufficient number of side links and roll carrying rods for the work in hand, these parts are preliminarily arranged as shown in FIG. 5, that is to say, the clip 13 is located with its perforations 14 in line with one of the rods 15. The next adjacent link is located with its short slot 11 in line with the rod and the second adjacent link is located with its longer slot 12 in the same line, the slots thus being arranged in overlapping relation or in partial registration. The bodies 10 of these two links are then passed through the clip 13 of the first link and the relation shown and the rod 15 passed through the group of three links thus assembled. A nut 17 is then threaded upon the end of the rod 15. The links are similarly assembled on the other end of the roll-carrying rods 15, and nuts 17 put in place, thus forming the other side of the conveyor.

As above stated, the width of the clip 13 is such as to receive two side links 10 with a substantial amount of clearance so that the links may shift freely longitudinally in the clip and also swing laterally to conform to a lateral curvature of the conveyor as a whole as suggested in FIG. 1. In so conforming the conveyor the links 10 of its convex side are expanded so that the rod 16 passes through the outer ends of the slots 11 and 12, while in the links of its concave side the rods pass through the inner ends or at intermediate points of these slots. The holes 14 are somewhat greater in diameter than the rods 16 thus providing for lost motion in setting up the elements of the conveyor. The slots 11 and 12 also afford clearance for the rods permitting angular adjustment.

Figure 6:
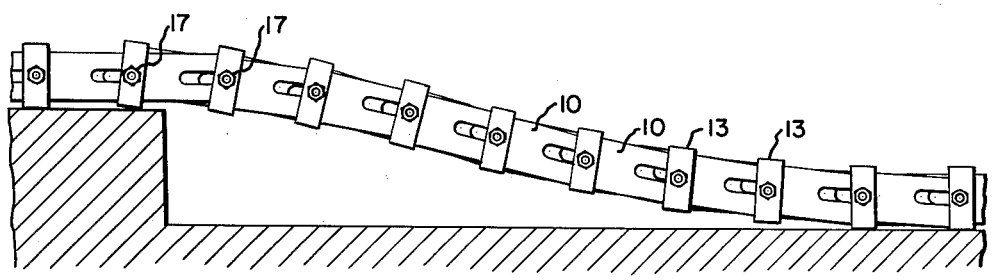
FIG. 6 is a view in side elevation showing the conveyor in a downwardly directed installation.

The lost motion connections between the side links also permits limited angular displacement of the side links in vertical sense where, for example, a descending position of the conveyor is desired as suggested in FIG. 6. It will be understood that the conveyor as a whole may be supported and mounted by legs or brackets to which selected side links may be bolted or it may rest with its clips 13 upon underlying foundations.

Having thus disclosed my invention and described in detail an illustration embodiment thereof, I claim as new and desire to secure by Letters Patent:

1. A flexible conveyor of the roller type, comprising a series of identical side links each having a clip at one end and long and short slots spaced apart and located on the longitudinal axis of the link, and transverse roll-carrying rods connecting the side links in groups of three by passing simultaneeously through the clip of one link, through the long slot of a second link and through the overlapping short slot of a third link.

2. A flexible roller conveyor comprising a series of overlapping side links, each link having slots of different lengths spaced lengthwise therein and having also an open clip attached at one end and perforated at right angles to the link, the said links being connected in groups of three with two of the links having certain slots that overlap within the clip of a third link, and roller-carrying rods having their opposite ends extended into the clip of each link and passing through overlapping slots of two side links therein.

3. A flexible roller conveyor as described in claim 2, further characterized in that one slot of each side link is twice the length of the other slot therein.

4. A flexible roller conveyor as described in claim 2, further characterized in that each side link has one long and one short longitudinal slot and that each roller-carrying rod passes through the long slot of one link and the short slot of another link, the said slot being disposed in overlapping relation.

5. A flexible roller conveyor as described in claim 2, further characterized in that the open clip of each link is attached in offset relation to one side of the link and that the perforation of the clip is located in alignment with the slots of the said link.

References Cited in the file of this patent

UNITED STATES PATENTS

| | | |
|---|---|---|
| 2,445,960 | Mapes | July 27, 1948 |
| 2,815,841 | Dabich | Dec. 10, 1957 |
| 2,890,779 | Aumann | June 16, 1959 |

FOREIGN PATENTS

| | | |
|---|---|---|
| 129,483 | Sweden | Sept. 12, 1950 |